(12) United States Patent
Hill

(10) Patent No.: US 12,259,207 B2
(45) Date of Patent: Mar. 25, 2025

(54) RECOIL REDUCTION SYSTEM

(71) Applicant: Robert Duane Hill, Madison, AL (US)

(72) Inventor: Robert Duane Hill, Madison, AL (US)

( * ) Notice: Subject to any disclaimer, the term of this patent is extended or adjusted under 35 U.S.C. 154(b) by 0 days.

(21) Appl. No.: 18/037,615

(22) PCT Filed: Nov. 22, 2021

(86) PCT No.: PCT/US2021/060283
§ 371 (c)(1),
(2) Date: May 18, 2023

(87) PCT Pub. No.: WO2022/109377
PCT Pub. Date: May 27, 2022

(65) Prior Publication Data
US 2024/0027152 A1    Jan. 25, 2024

Related U.S. Application Data

(60) Provisional application No. 63/116,307, filed on Nov. 20, 2020.

(51) Int. Cl.
*F41C 23/06* (2006.01)
*F41A 3/80* (2006.01)

(52) U.S. Cl.
CPC .............. *F41A 3/80* (2013.01); *F41C 23/06* (2013.01)

(58) Field of Classification Search
CPC ....................................................... F41C 23/06
See application file for complete search history.

(56) References Cited

U.S. PATENT DOCUMENTS

| | | | | |
|---|---|---|---|---|
| 1,255,566 A | * | 2/1918 | Pearson | F41C 23/06 42/74 |
| 1,501,220 A | * | 7/1924 | Kreissig | F16F 3/06 213/40 S |
| 2,414,250 A | * | 1/1947 | Williams | F41C 23/16 89/14.3 |
| 2,456,652 A | * | 12/1948 | Simpson | F41A 3/78 89/198 |
| 2,732,767 A | * | 1/1956 | Herlach | F16F 7/08 89/44.01 |
| 2,866,389 A | * | 12/1958 | Simpson | F41A 3/78 89/198 |
| 2,982,183 A | * | 5/1961 | Colby | F41A 19/03 89/129.01 |
| 3,019,543 A | * | 2/1962 | Ducharme | F41C 23/06 42/74 |

(Continued)

*Primary Examiner* — Derrick R Morgan
(74) *Attorney, Agent, or Firm* — Baker Donelson

(57) ABSTRACT

An improved recoil reduction system comprises a forward body, a friction spring, a rear body, a bolt, and, optionally, a bumper. When in forward battery, the said friction spring is compressed to a preloaded operating point by the bolt. In embodiments, when a weapon equipped with the improved recoil reduction system is fired, the front body is impacted by the bolt carrier group of the weapon and the rear body moves aft and strikes the rear of the shoulder stock of the weapon, compressing the friction spring. During compression, the tapered mating surfaces of the friction spring generate friction and thereby dissipate the energy generated from firing the weapon in the form of heat, thus reducing the felt recoil of the weapon.

11 Claims, 13 Drawing Sheets

(56) References Cited

U.S. PATENT DOCUMENTS

| | | | | |
|---|---|---|---|---|
| 3,538,811 | A * | 11/1970 | Poole | F41A 3/78 89/169 |
| 3,754,344 | A * | 8/1973 | Spiliotis | F41C 23/06 42/74 |
| 4,183,510 | A * | 1/1980 | Kontis | F41A 25/10 89/44.01 |
| 4,397,217 | A * | 8/1983 | Hupp | F41A 25/12 89/177 |
| 6,481,142 | B1 * | 11/2002 | McCarthy | F41C 23/06 42/74 |
| 7,090,207 | B2 * | 8/2006 | Qutub | F16F 3/06 267/207 |
| 7,478,495 | B1 * | 1/2009 | Alzamora | F41A 3/84 89/44.01 |
| 9,080,823 | B1 * | 7/2015 | Mantas | F41A 3/84 |
| 10,156,422 | B1 * | 12/2018 | Valin | F41C 23/20 |
| 10,260,837 | B1 * | 4/2019 | McGinty | F41A 3/84 |
| 10,663,252 | B1 * | 5/2020 | Sprainis | F41C 23/08 |
| 11,280,566 | B1 * | 3/2022 | Rigler | F41A 3/84 |
| 2005/0246931 | A1 * | 11/2005 | Poff | F41C 23/06 42/1.06 |
| 2006/0236853 | A1 * | 10/2006 | Boersching | F41A 3/70 89/198 |
| 2008/0110074 | A1 * | 5/2008 | Bucholtz | F41C 23/06 42/1.06 |
| 2008/0173168 | A1 * | 7/2008 | Gussalli Beretta | F41A 5/02 89/173 |
| 2010/0050492 | A1 * | 3/2010 | Faifer | F41A 25/12 42/1.06 |
| 2013/0319217 | A1 * | 12/2013 | Gangl | F41A 3/84 89/198 |
| 2017/0067716 | A1 * | 3/2017 | Huang | F41C 23/06 |
| 2017/0122682 | A1 * | 5/2017 | Mantas | F41A 3/86 |
| 2018/0010870 | A1 * | 1/2018 | Mantas | F41A 3/86 |
| 2020/0096269 | A1 * | 3/2020 | Cozad | F41A 3/84 |

* cited by examiner (A)

| ELEMENT NUMBER | STACKED HEIGHT | OUTER SPRINGS | INNER SPRINGS | END SPRINGS |
|---|---|---|---|---|
| 14 | 2.73 | 7 | 6 | 2 |
| 12 | 2.34 | 6 | 5 | 2 |
| 10 | 1.95 | 5 | 4 | 2 |
| 8 | 1.56 | 4 | 3 | 2 |

(B)

| CALIBER CONFIGURATION TABLE | | | | | | | | | |
|---|---|---|---|---|---|---|---|---|---|
| 270 WIN | 270 WIN SHORT MAGNUM | 7MM-C8 REMINGTON | 7MM REMINGTON | 30-06 SPRINGFIELD | 300 WINCHESTER SHORT MAGNUM | 300 WIN MAGNUM | 308 WINCHESTER | 300 REMINGTON ULTRA MAG | 6.5 CREEDMOOR |
| -8 | -10 | -8 | -14 | -12 | -12 | -12 | -8 | -14 | -6 |

RECOIL REDUCTION SYSTEM

CROSS REFERENCE TO RELATED APPLICATIONS

This application derives priority from U.S. Provisional Patent Application No. 63/116,307, filed 20 Nov. 2020, the entirety of which is incorporated herein by reference.

BACKGROUND OF THE INVENTION

Field of the Invention

This invention disclosed herein generally relates to firearms. More specifically, the invention relates to recoil mechanisms for firearms. Even more specifically, recoil mitigation mechanisms of rifles and shotguns.

Description of the Background

When a gun is fired, the bullet travels along the gun's barrel and exits its muzzle. A change in momentum results in a force, which according to Newton's second law is equal to the time derivative of the gun. Recoil is the rearward thrust generated when a gun is discharged and is common to all firearms. The nature of the recoil process is determined by the force of the expanding gases in the barrel of the firearm, which is equal and opposite to the force upon the ejecta, or bullet, and the action type of the firearm. In most small firearms, the momentum is transferred to the ground through the body of the shooter, while in heavier guns such as mounted machine guns and heavy artillery, the momentum is transferred to the ground through the gun's mount.

For smaller firearms, which are manually fired by a shooter, recoil, or the anticipation of recoil, can disturb the alignment of the firearm resulting in inaccurate firing of the weapon. Because the felt effect of recoil is greater in higher caliber weapons, it is often difficult or painful for a shooter to fire a high caliber weapon multiple times without a loss of accuracy or injury. As such, significant recoil, or recoil from repeated firing of weapons, may result in injury to the shooter's shoulder, wrist and/or hand. Therefore, there exists a need for an improved system that reduces the recoil in smaller firearms.

U.S. Pat. No. 2,951,424 for a "Gas Operated Bolt and Carrier System" is used in the design of the M-15, AR-15, M-4 and AR-10 rifle series (herein collectively referenced as "AR rifles"). This action system is known as a "direct impingement system" because a portion of the gas from a fired cartridge is redirected so that it interacts directly with the rifle's bolt carrier group to cycle the weapon. AR rifles are used by civilians, law enforcement, and military personnel around the globe.

Specifically, a standard AR rifle recoil assembly comprises a buffer. The buffer comprises a body with a solid face for being impacted by the bolt carrier group and an end cap for impacting the shoulder stock. The basic weapon buffer has changeable mass inserts to create multiple mass impacts within the buffer during recoil. This mechanism only spreads out the energy of the impact of the bolt carrier group and does not reduce the amount of energy of the recoil. In some prior art systems a captured spring recoil system uses a coil spring and changeable mass impacts to accomplish the same task. In other prior art embodiments, a hydraulic compensated weapon buffer uses a hydraulic damper to reduce recoil. This implementation is velocity dependent of the bolt carrier group. A major disadvantage to this implementation is that it reduces the firing rate of the weapon.

When an AR rifle utilizing the direct impingement system is fired, gas from the burning propellant forces the bullet through the barrel of the weapon. Before the bullet exits the barrel of the weapon, the system distributes the propellant gas through a small hole in the barrel of the weapon, which is channeled through a tube where it directly impinges the weapon's bolt carrier mechanism. Specifically, the propellant gas drives the bolt carrier group and buffer assembly rearward into the buffer tube located in the stock of the weapon. The buffer assembly impacts the rear of the buffer tube and shoulder stock, ejecting the spent gas.

When the buffer assembly is forced rearward, the buffer assembly compresses the recoil spring. During this rearward movement, a track in the upper portion of the bolt carrier forces the cam pin and bolt clockwise such that the bolt locking lugs are unlocked from the barrel extension locking lugs. As the bolt carrier group moves rearward, the empty cartridge case is removed from the chamber and ejected from the weapon.

When the bolt carrier group reaches its rearward most position, the compressed recoil spring expands pushing the buffer assembly forward which drives the bolt carrier group forward again allowing chambering of a new round from the weapon's magazine, thus completing the cycle of the bolt carrier assembly, wherein the bolt carrier moves back to its original position.

Despite some drawbacks, the Stoner design has been extremely successful as proven by its use in millions of rifles for many decades. The main advantages of the Stoner design relate to the simplicity of the system and the fact that all moving parts of the recoil systems are in line with the bore. Specifically, the muzzle, barrel, bolt, bolt carrier group, buffer and recoil spring all exist along the same axis in the Stoner design improving accuracy by limiting muzzle rise.

Moreover, firearms featuring a direct impingement system are typically lighter than their piston operated counterparts. The force that the body feels when discharging a firearm is dissipating the kinetic energy of the recoiling gun mass. As such, a heavier firearm, a gun with more mass, will manifest lower recoil kinetic energy and result in a lessened perception of recoil. Conversely, lighter firearms, a firearm with less mass, will manifest higher recoil kinetic energy and result in an increased perception of recoil as opposed to heavier firearms. Therefore, one disadvantage of a lighter firearm, a firearm with less mass, is that such firearms produce greater recoil when fired. Additionally, the use of larger rounds in lighter weapons further increases the recoil produced when firing the weapon.

Another disadvantage of a standard AR rifle recoil assembly utilizing the direct impingement system is that the buffer travels to the rear of the buffer tube which causes the weapon to have more felt recoil due to more mass at the rear of the weapon. Thus, a need exists to reduce the felt recoil force especially in higher energy cartridges.

A need for improved recoil reduction is not limited to direct impingement system weapons. For traditional bolt action rifles and shotguns, existing recoil damper systems are based on coil springs or coils springs with fluid filled pistons, shocks or hydraulic dampers. These modifications to the butt stock of a rifle or shotgun are complex and, in many cases, require major modification or a completely redesigned rifle stock. Additionally, many of these traditional coil spring recoil systems are inefficient and may malfunction resulting in damage to the weapon or injury to the shooter. For example, in the case of the fluid filled dampers, repeated use often yields certain leakage of the pistons. In the case of heavily pre-loaded springs, spring failure could result in severe harm to the shooter. Therefore, a need exists for an improved recoil reduction system that can be adapted to factory standard weapons, without significant modification, and is more reliable and suitable for continuous and extended use.

The present invention provides an improved reduction system for a firearm and overcomes disadvantages of the previously mentioned prior art.

SUMMARY OF THE INVENTION

The present invention disclosed herein generally relates to an improved recoil reduction system that absorbs the force of the recoiling or cycling weapon and dissipates a portion of the energy in the form of heat through the use of friction springs. The improved recoil reduction system comprises a forward body, a friction spring, a rear body, a bolt, and, optionally, a bumper. When in forward battery, the said friction spring is compressed to a preloaded operating point by the bolt. In embodiments, when a weapon equipped with the improved recoil reduction system is fired, the front body is impacted by the bolt carrier group of the weapon and the buffer moves to the aft of the shoulder stock. As the bumper and moveable rear body strike the rear of the shoulder stock of the weapon, the friction spring compresses. The friction spring compresses axially when the interior elements of said spring contract radially and exterior elements expand radially. The said friction spring comprises a plurality of concentric inner and outer rings with mating tapered surfaces. During compression, the tapered mating surfaces of the friction spring generate friction and thereby dissipate the energy generated from firing the weapon in the form of heat. Thus, reducing the felt recoil of the weapon. The various components of the improved recoil reduction system are fitted together such that they may be inserted into the buttstock of a weapon.

Alternative embodiments describe modifications to the inventive system to make it compatible with other types of shotguns and rifles, and methods for same.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Definitions

Figure 1:
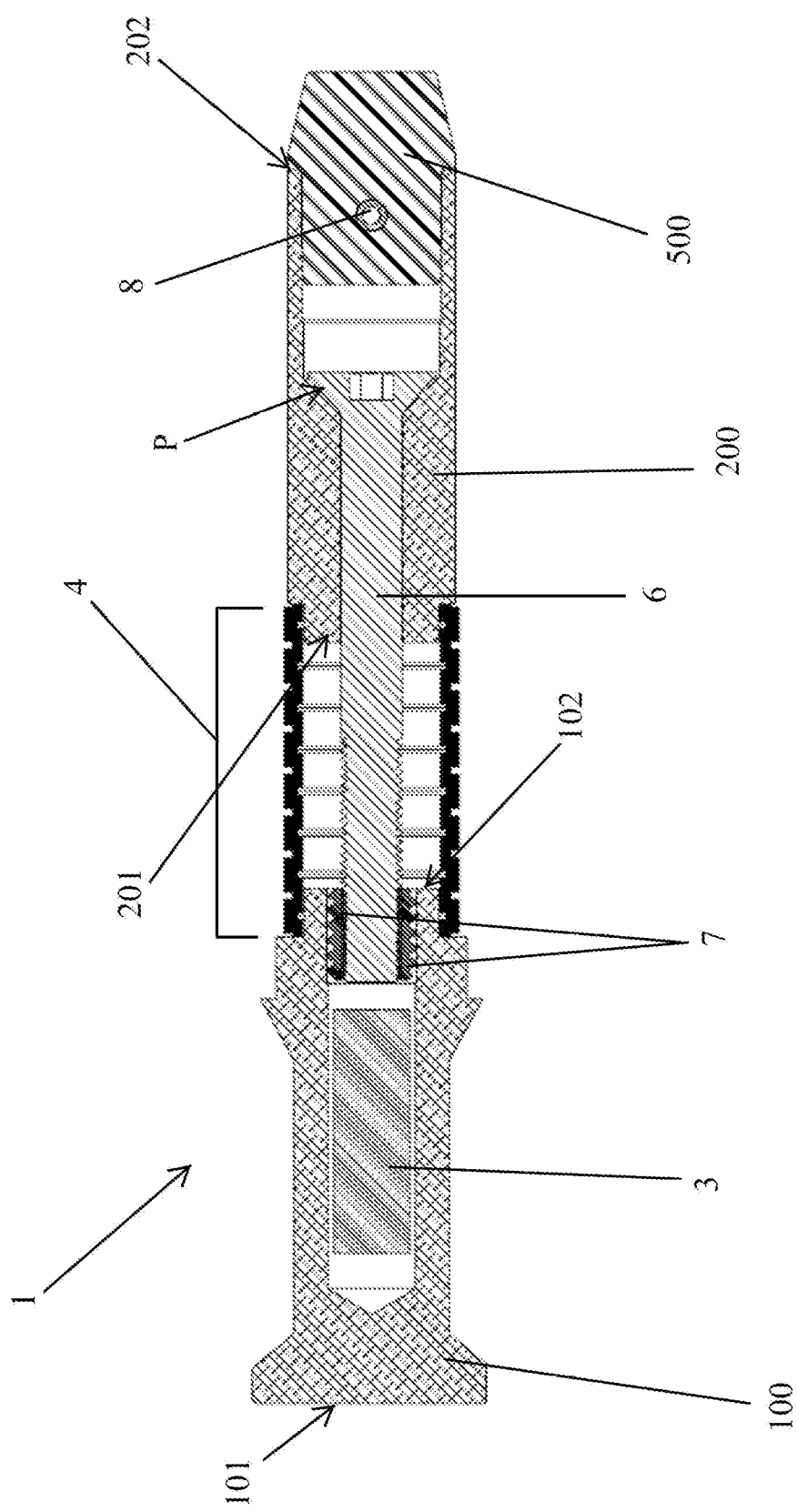
FIG. 1 is a cross-sectional view illustrating a first embodiment of the improved recoil reduction system in which the system has been adapted to use in an AR semiautomatic weapon

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terminology used herein is for the purpose of describing particular embodiments only and is not intended to be limiting. As used herein, the singular forms "a," "an." and "the" are intended to include the plural forms as well, unless the context clearly indicates otherwise.

The term "comprise" (and any form of comprise such as "comprises" and "comprising") is used as an open-ended linking verb. It will be understood that these terms are mean to imply the inclusion of a stated element, integer, step, or group of elements, integers, or steps, but not the exclusion of any other element, integer, step or group of elements, integers, or steps. As such, a system, method, or apparatus that "comprises" one or more elements prosses those one or more elements but is not limited to possessing only those one or more elements.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

Spatially relative terms, such as "under", "below", "lower", "over", "upper" and the like, may be used herein for ease of description to describe one element or feature's relationship to another.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Improved Recoil Reduction System

An improved recoil reduction system that absorbs the force of a cycling weapon and dissipates a portion of the energy in form of heat through the use of friction springs is herein disclosed. While the improved recoil reduction system disclosed herein is discussed for utilization in direct impingement and traditional bolt action weapons, it should be appreciated that the improved recoil reduction system can be adapted to many applications where a recoil reduction system would improve the operation or "user friendliness" of the weapon.

Specifically, embodiments of the improved recoil reduction system disclosed herein can, advantageously over the prior art, be adapted to various types of rifles, including semiautomatic rifles (commonly called "AR weapons") including AR-15's, M-16's, and the like, or shotguns, including those with synthetic, wood, and/or collapsible stocks. Also advantageously, the inventive system includes means for adapting the herein-disclosed recoil reduction system to custom applications, including to gun stocks which are traditionally incompatible with known recoil assemblies and/or which may require major modification to incorporate one or more of the various embodiments of the inventive recoil reduction system disclosed here. Accordingly, there are disclosed herein methods of customizing and optimizing an improved recoil reduction system to one or more of the above-named classes of weapons.

In preferred embodiments of the disclosed recoil reduction system, the improved recoil reduction buffer system comprises a forward body 100, a friction spring 4, a moveable rear body 200, and a bolt 6. As will be described, although the complete assembly of each of these critical components, and their functionality, remains constant throughout each of the preferred embodiments describe herein, the exterior configuration(s) of the forward 100 and rear 200 bodies are adaptable to accommodate various classes of weapons. Moreover, as will be described, the inventive recoil reduction system utilizes a friction spring 4 which can be modified based on the energy class of the weapon to which it will be applied, and/or based on user preference.

FIG. 1 is a cross-sectional view illustrating a first embodiment of the improved recoil reduction system in which the system has been adapted to use in an AR semiautomatic weapon. In embodiments, a given AR weapon may be retrofitted to accommodate the disclosed recoil reduction system by replacing the factory-standard buffer with the disclosed improved recoil reduction system, typically by inserting it into the existing buffer tube of the AR weapon. In an exemplary embodiment, the improved recoil reduction system has a total outside diameter that is less than the inside diameter of the buffer tube. Having these dimensions, the improved recoil reduction system fits within a factory standard buffer tube of weapons and firearms without modification.

As noted above, the recoil reduction system 1 comprises a forward body 100, a friction spring 4, a movable rear body 200, and a bolt 6. In this embodiment, the forward body 100 comprises a generally cylindrical body with one or more exterior flanges for accommodating the existing interior geometry of the buffer tube of the AR weapon. Exterior flange(s) may beneficially act as guides in the buffer tube of the AR weapon, and as part of the retention system. In embodiments (such as the embodiment shown in FIG. 1), the forward body 100 comprises a face 101 on its first end for a bolt carrier group of the weapon to impact. In embodiments, face 101 includes a flange to provide a broader seat for the inventive recoil reduction system 1, providing just enough energy to drive the bolt carrier group of an AR weapon in which the invention is applied forward into battery position. The second end 102, opposite the first end, of the forward body 100 is preferably at least partially hollow to accommodate, at least, a distal end of bolt 6, as will be described. Specifically, in embodiments, the second end 102 includes a hollow interior cavity extending a portion of the total length of forward body 100. In preferred embodiments, the interior cavity is cylindrical with a primary axis coexistent with the primary axis of forward body 100. It may be sized and shaped to accommodate one or more of the distal end (tip) of bolt 6, a threaded insert 7 for capturing the distal end of bolt 6, and/or a weight 3. In embodiments, threaded insert 7 may be a key locking insert or like device for capturing the distal end of bolt 6 securely within the interior of the forward body 100. In embodiments, weight 3 may be a cylindrical body sized to fit within the interior cavity of forward body 100. Preferred materials for weight 3 may be tungsten or other high-density materials known in the art. As will be described, weight 3 may be customized to optimize the cyclical action of the gun to which the inventive recoil system is applied.

Also in the embodiment illustrated in FIG. 1, rear body 200 may also comprise a cylindrical body having a cavity running all or part of the way through the interior thereof, and along the primary axis thereof. The rear body cavity may be sized and shaped to accommodate a proximal end (head) of bolt 6 and, optionally, all or part of a bumper 500. In embodiments, an optional bumper 500 comprises a generally cylindrical body with a first sized and shaped to fit into the interior cavity of rear body 200 at the second end 202 of rear cavity 200, and a second end comprising a base in the form of a flange, which provides a surface for engaging the rear of the shoulder stock of the weapon when the weapon is fired. As noted, rear body 200 may comprise a cavity to house optional bumper 500 at a second end 202 of rear body 200, and bolt 6 within the interior of rear body 200, which is preferably sized and shaped to be housed along the primary axis of rear body 200 and extend a specified distance from the first end 201 of rear body 200. In alternative embodiments, bolt 6, rear body 200 and/or optional bumper 500 may be a unitary piece and/or co-molded component.

In embodiments, the interior cavity of rear body 200 may be sized and shaped to make bolt 6 self-centering. As shown in FIG. 1, the interior cavity of rear body 200 may have a conical pocket (designed by reference character P) which has an interior dimension matching the exterior dimension of the conical proximal end (head) of bolt 6. When the buffer actuates, the recoil reduction system (specifically, friction spring 4) compresses, which causes the rear body 200 to move to left. The threaded distal end (tip) of bolt 6 is fixed within front body 100, but bolt 6 moves to become proud of the countersunk pocket P that it normally centers in within the interior cavity of rear body 200. Because the bolt 6 runs through the center of friction spring 4, when the friction spring 4 relaxes and the components in this embodiment return to rest, bolt 6 centers the entire device by centering each component along a common centerline as bolt 6 re-seats in the conical pocket P.

Figure 2:
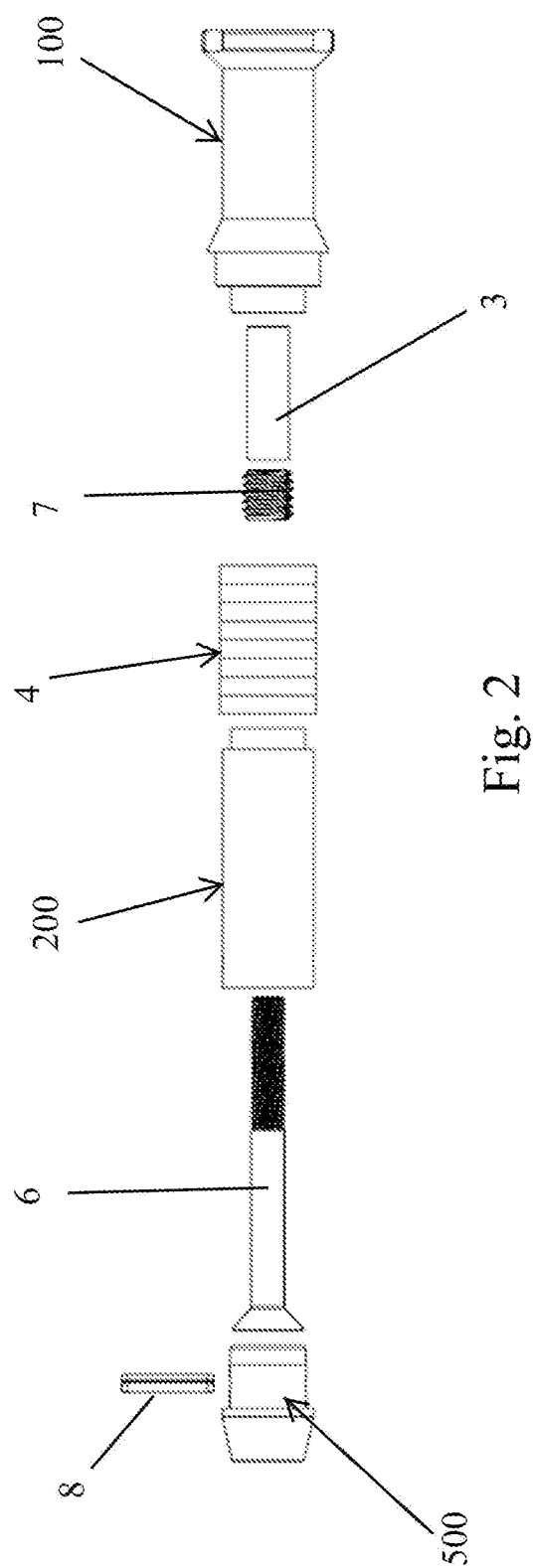
FIG. 2 is an exploded view of the embodiment of the inventive recoil system illustrated in FIG. 1.

With reference to FIG. 1 and FIG. 2, an exploded view of the embodiment of the inventive recoil system illustrated in FIG. 1, the second end 102 of the forward body 100 and the first end 201 of the rear body 200 are sized and shaped to capture friction spring 4, described in greater detail below, therebetween. As shown in FIG. 2, the first end 201 of the rear body 200 is generally smaller in diameter than the main/central portion of rear body 200, such that when the various components of the improved recoil reduction system are assembled together, as will be described, friction spring 4 covers, at least partially, the first end 201 of the rear body 200. Also as shown in FIG. 2, the second end 102 of the forward body 100 is generally smaller in diameter than the main/central portion of forward body 100. The said second end 102 extends axially from the center of the forward body 1 such that when the components of the improved recoil reduction system are assembled together, friction spring 4 at least partially fits over the second end 102 of forward body 100.

FIGS. 1 and 2 also illustrate that, in some embodiments, rear body 200 further comprises a retaining pin aperture sized to accommodate a retaining pin 8. In embodiments, bumper 500 may also comprise a retaining pin aperture extending at least partially through the body thereof, which apertures are located so as to be aligned when the system is fully assembled.

Figure 3:
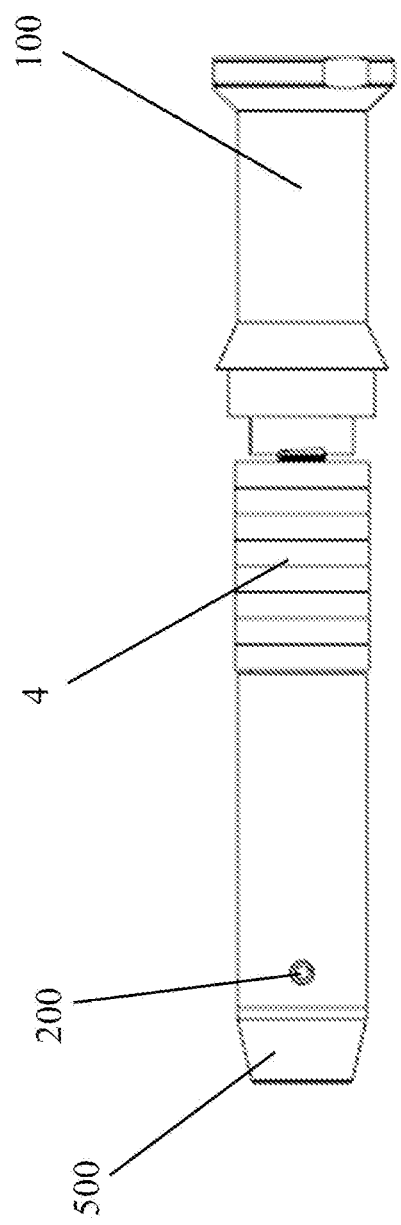
FIG. 3 shows an exterior view of the fully assembled recoil system according to an embodiment of the invention.

In embodiments, to assemble the improved recoil system illustrated in FIGS. 1 and 2, weight 3 (if used) is first inserted into interior cavity of forward body 100. Threaded insert 7 is then inserted into the interior cavity of forward body 100. The bolt 6 may also be inserted into the second end 202 of the rear body 200, and pushed through the interior cavity thereof until the bolt 6 extends at least partially out of the first end 201 of rear body 200. A back end of friction spring 4 is then inserted over the bolt 6 until friction spring 4 partially covers the bolt 6, and at least partially covers the first end of rear body 200. The second end 102 of the forward body 100 is then inserted into the opposite (front) end of the friction spring 4 until the front end of the friction spring 4 covers, at least partially, the second end of the forward body 1. In preferred embodiments, this engages the distal (tip) end of bolt 6, which is at least partially threaded, with the interior cavity of forward body 100. In embodiments, the distal end of bolt 6 is retained within the interior cavity of forward body 100 via engagement with the interior threading of threaded insert 7. At any time after bolt 6 is inserted into rear body 200, the bumper 500 may also be inserted into the second end 202 of the rear body 2 until the second end of the rear body 200 covers, at least partially, bumper 500. Thereafter, the retaining pin 8 may be inserted, at least partially, into the retaining pin aperture of rear body 200 to secure the bumper 500 in place at least partially within the cavity at the rear end 202 of rear body 200, thereby also providing a second means (the first being the engagement of the distal end of bolt 6 with the threaded insert 7) of preventing bolt 6 from sliding backwards through or out of the second end 202 of rear body 200. Accordingly, in embodiments, when the unit is fully assembled, forward body 100 and rear body 200 are compressed towards each other by the engagement of bolt 6 and treaded insert 7, with friction spring 4 therebetween. When in a battery position, the completed assembly thus compresses the friction spring 4 to a predetermined tension level. An exterior view of the fully assembled recoil system according to an embodiment of the invention (also shown in FIGS. 1-2) is shown in FIG. 3.

In alternative embodiments, as noted above, bolt 6, rear body 200, and/or bumper 500 may be one or more unitary parts, in which case steps requiring assembly of individual components may be eliminated as will be understood to a person having ordinary skill in the art. Moreover, the use of a bumper 500 and/or weight 3 may be eliminated entirely, with corresponding modifications to the method of assembly described above.

Figure 4:
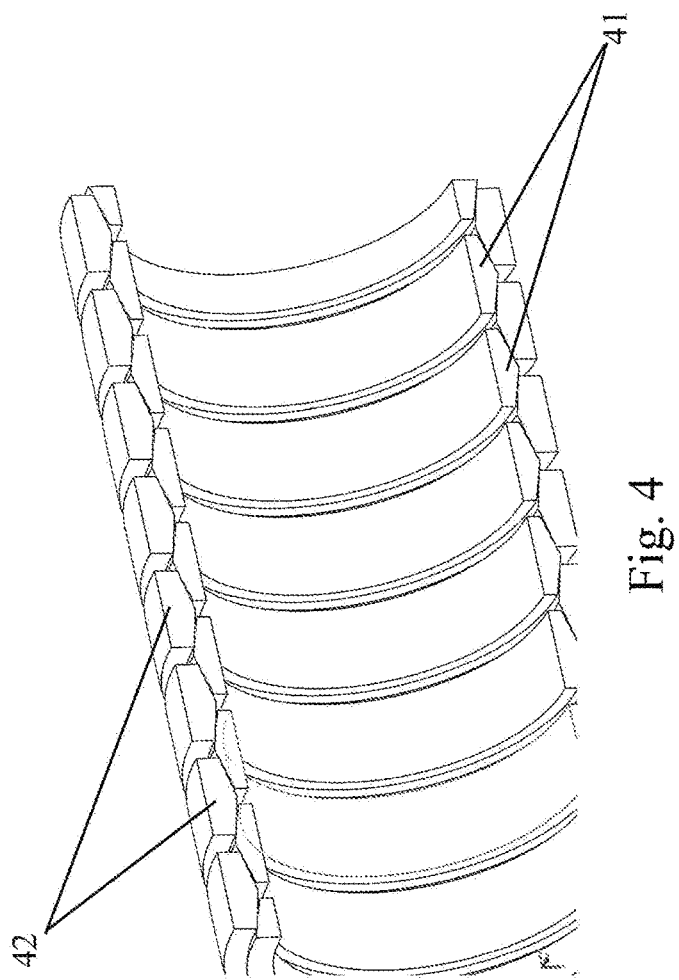
FIG. 4 shows a close-up, cutaway view of friction spring 4 according to embodiments of the present invention.

Friction spring 4 comprises a plurality of concentric inner 41 and outer 42 rings with mating tapered surfaces. A close-up, cutaway view of friction spring 4 is shown in FIG. 4. When the spring compresses, such as under the force of the bolt carrier group of a weapon moving backwards as the weapon is fired, the gaps that exist between inner 41 rings, at rest, compress; likewise in the case of the spaces between outer 42 rings. As the gaps between adjacent inner 41 springs compress, the tapering of their top surfaces causes the collective inner springs 41 to push out against outer springs 42, causing them to expand radially. Likewise, as the gaps between adjacent outer 42 springs compress, their tapered inner surfaces push in against the adjacent surfaces of inner springs 41, causing them to contract radially. The compressing of the friction spring 4 thereby generates friction and at least partially dissipates the energy created by firing of the weapon in the form of heat, thus reducing the felt recoil of the weapon.

Figure 5:
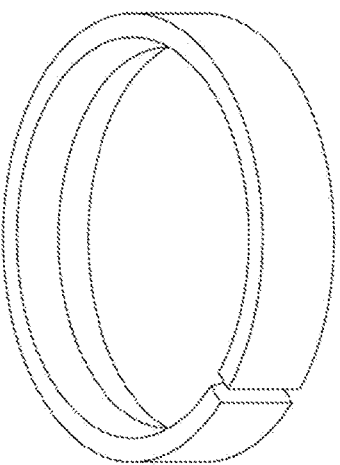
FIG. 5 shows a close up of notching one or more of the rings of friction spring 4 according to embodiments of the present invention.

In embodiments, both an outer 42 and an inner 41 rings of friction spring 4 may be notched, as shown in FIG. 5 to change the performance dynamics of friction spring 4. Notching one or more of the rings of friction spring 4 lowers the spring constant and ultimately the force against the adjacent rings. Accordingly, the present invention provides customization of the "feel" of the recoil, i.e. "stiff" or "soft", based on user requirements, by adjusting the width of the notching on the rings 41, 42 of friction spring 4 proportionally to the desired reduction of adjacent spring force.

Thus, when a firearm equipped with the improved recoil reduction system is fired, the said front body 100 is impacted by the bolt carrier group of the weapon forcing the recoil reduction system toward the aft of the shoulder stock of the weapon. As the rear body 200 (and optional bumper 500) strike the rear of the shoulder stock of the weapon, the friction spring 4 compresses as described. The resultant reduction in the felt recoil of the weapon provides a number of advantages. Two of the primary advantages are: (1) a reduction in the force impacting the user, i.e., to his/her shoulder or other part of his/her body where the stock may be braced during firing; and (2) a reduction in the "rise" of the gun barrel, which helps to (2A) improve accuracy of the shot, either due to the rise itself and/or the anticipation of same on of the user, and (2B) improve gun safety from potentially errant shots caused by barrel rise.

As noted above, the improved recoil reduction system according to the present invention may take various exterior shapes and sizes to accommodate retrofit and/or custom fit to one or more different types of weapons.

Figure 6:
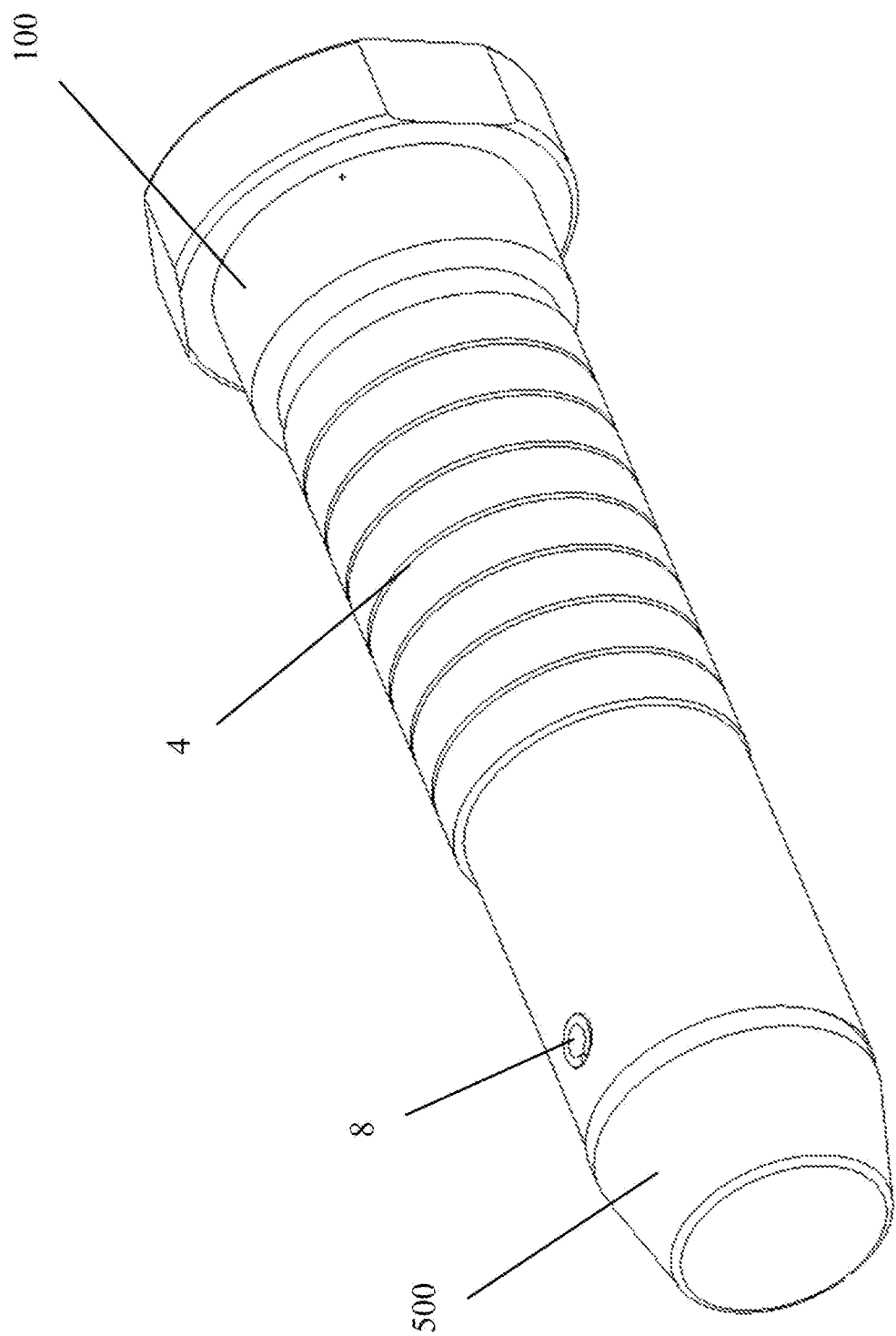
FIG. 6 shows a version of the invention which has been modified to fit inside a buffer tube in an AR-class weapon according to embodiments of the present invention.

An exterior view of one alternative embodiment is shown in FIG. 6. As shown therein, forward body 100 may take various shapes and sizes to accommodate the particular interior dimensions of the buffer tube in the AR-class weapon to which the inventive system will be applied by retrofit. However, it will be understood that any of forward body 100, rear body 200, and/or optional buffer 500 may take different forms depending on the make and model of weapon for which it is designed, provided that, collectively, they perform the function of capturing and compressing friction spring 4 therebetween, by, in preferred embodiments, the compressive force of bolt 6 which is compressed and held securely between forward body 100 and rear body 200, running through the interior of friction spring 4.

Figure 7:
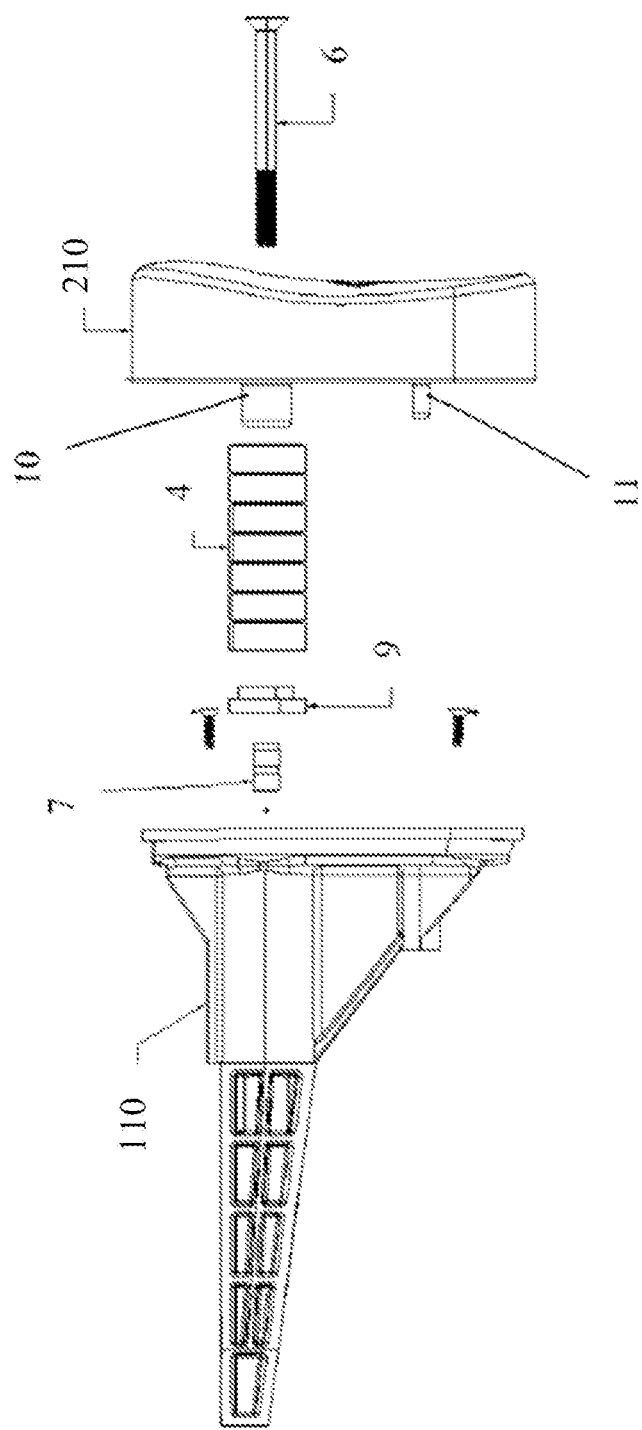
FIG. 7 shows an alternative embodiment of the improved recoil reduction buffer system adapted for use in shoulder-fired weapons.

In some embodiments, the improved recoil reduction system may be adapted for use in shoulder fired weapons. With reference to FIG. 7, an alternative embodiment of the improved recoil reduction buffer system comprises a modified rear body 210, a friction spring 4, and a modified forward body 110. The modified forward body 110 may have a fixing feature such as a threaded insert 7 (of the one or more types described in other embodiments herein) and/or spring seat 9 for capturing one end of the friction spring 4. The modified rear body 210 may have a shoulder pad with a spring seat 10 for capturing the other end of friction spring 4. Spring seats 9, 10 may be integrally-formed parts of modified forward 110 and rear 210 bodies, respectively, and/or may be separable components which are assembled in a manner similar to that described with respect to the embodiment shown in FIGS. 1-2. Spring seats 9, 10 may provide the same functionality as that of reduced-diameter portions of front 100 and rear 200 bodies in the embodiment shown in FIGS. 1-2; that is, to provide a fixed body for either end of friction spring 4 to cover so as to be compressed between front and rear bodies. For clarification, front and rear bodies may be modified from embodiment to embodiment in order to be adaptable for insertion into one or more different types of weapons, but in each case, the requirements for each forward body are (1) to provide a fixed, preferably cylindrical body with a diameter smaller than that of the interior diameter of friction spring 4, for friction spring 4 to cover (in the instant embodiment, spring seat 9), and (2) to provide a secure attachment point for the distal (tip) end of bolt 6. Likewise, in each case, the requirements for each rear body are (1) to provide a fixed, preferably cylindrical body with a diameter smaller than that of the interior diameter of friction spring 4, for friction spring 4 to cover (in the instant embodiment, spring seat 10), and (2) to provide a non-fixed seat or pocket within which the proximal (head) end of bolt 6 can securely rest and, in preferred embodiments, re-center.

Figure 8:
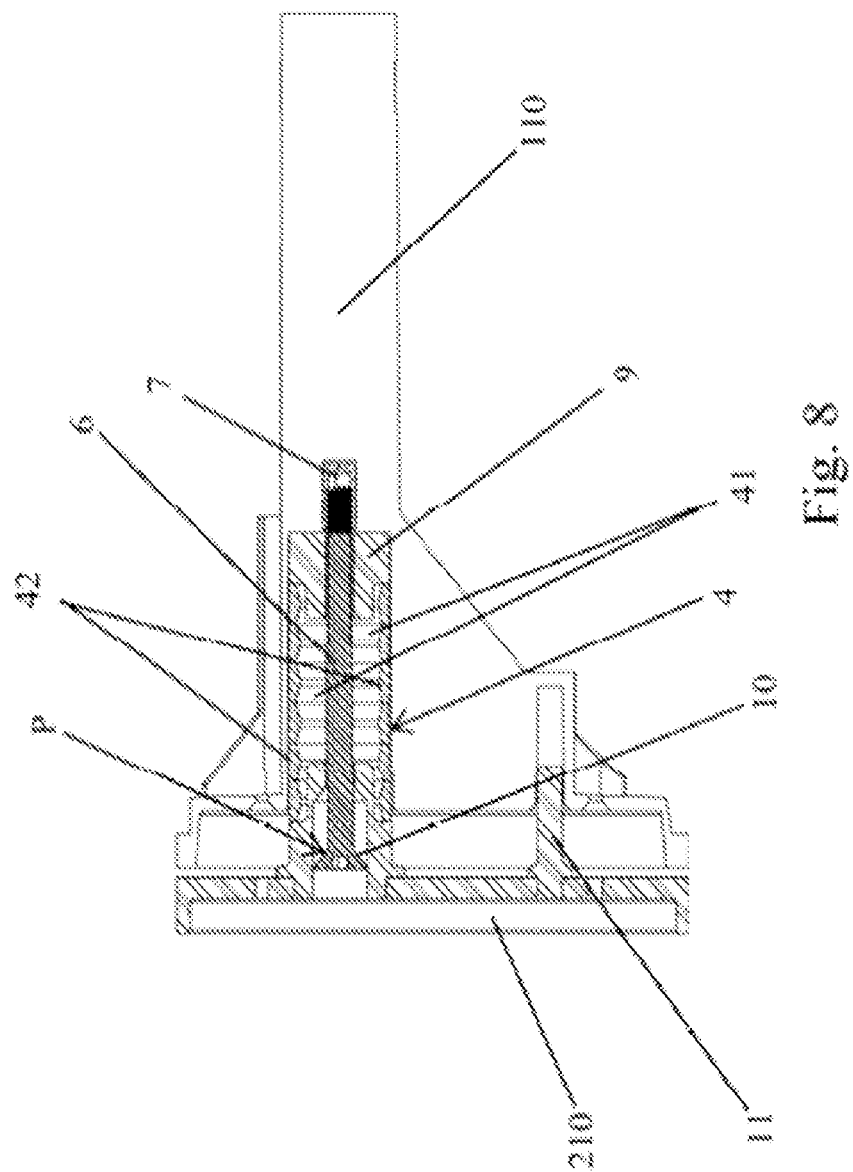
FIG. 8 shows a cutaway view of the embodiment shown in FIG. 7.

A cutaway view of the instant embodiment is shown in FIG. 8. There, it can be seen that modified forward body 110 comprises an interior cavity with a step-down in cross sectional diameter towards the front of modified forward body 110 to provide a reduced-diameter portion in which threaded insert 7 may be housed to capture the distal end of bolt 6. To the rear of reduced-diameter portion, spring seat 9 is housed in a wider diameter portion of the interior cavity of modified forward body 110. One end of friction spring 4 covers at least a portion of spring seat 9. The other end of friction spring 4 covers at least a portion of spring seat 10, which in this embodiment is either unitary within, or extending from a face of, modified rear body 210. Spring seat 10 also includes a pocket P for capturing the head of bolt 6, for self-centering action: as described herein. Bolt thus compresses modified forward 110 and rear 210 bodies together, with spring therebetween, and the functionality of this embodiment of the inventive recoil reduction system is the same as that of the previously-described embodiment. Thus, when a shoulder fired weapon equipped with the improved recoil reduction system is discharged, the modified forward body 110 transfers the recoil impulse into the said friction spring 4, which compresses as modified rear body 210 is fixed against the shoulder of the shooter.

In embodiments, modified rear body 210 may further comprise an anti-rotation pin 11 to keep modified rear body 210 aligned with modified forward body 110 rifle stock or rifle stock insert.

Figure 9:
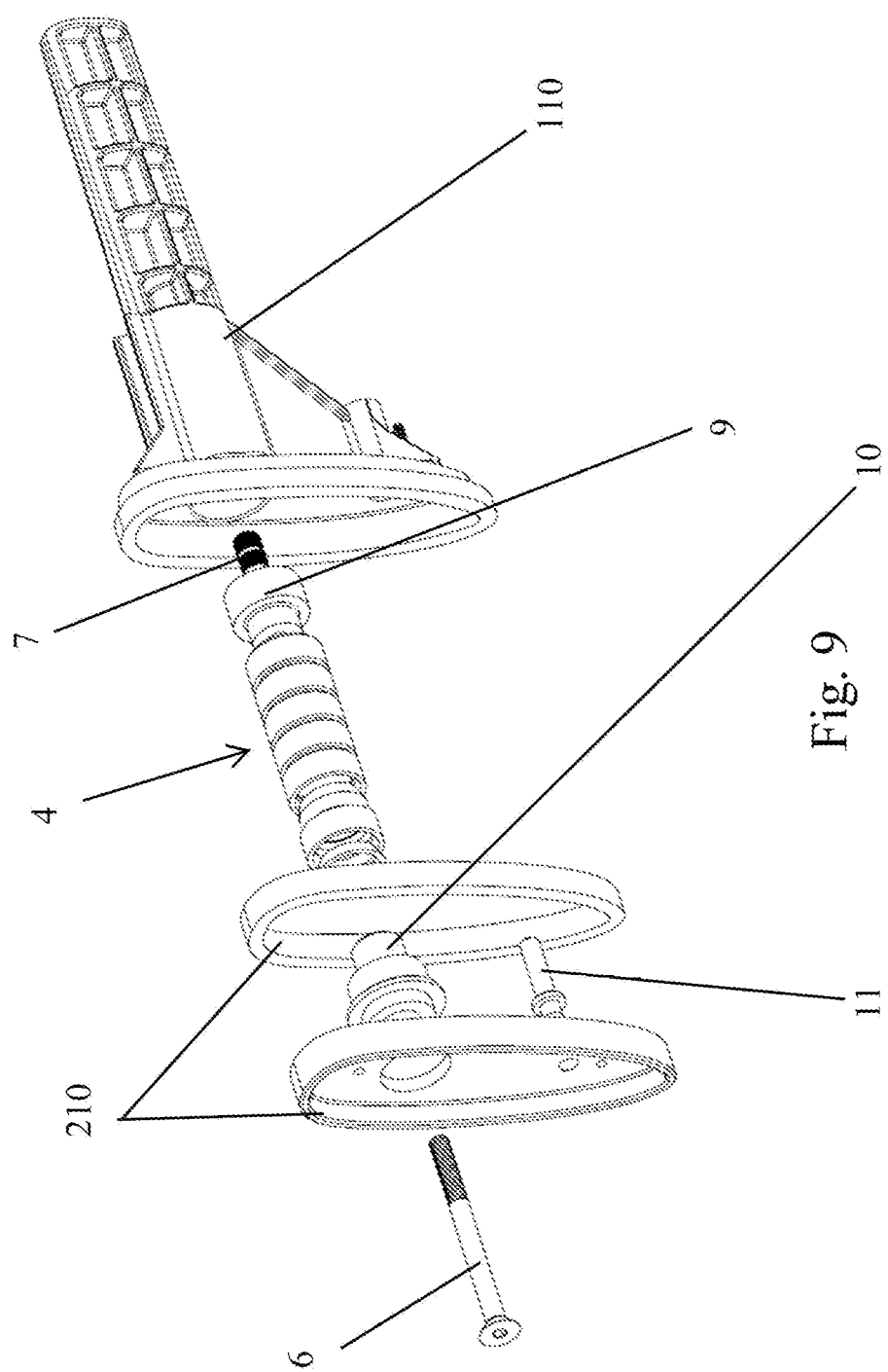
FIG. 9 shows an exploded view of the embodiment shown in FIG. 7

An exploded view of the embodiment shown in FIG. 8 is shown in FIG. 9.

In embodiments, spring seat 9, 10 may alternately be described as, or take the form of, a "spacer" that has approximately the same exterior dimensions as friction spring 4 along at least part of its length. In these embodiments, the number of total rings (combination of inner 41 and outer 42) in friction spring 4 may be varied based on the energy class of the weapon, and/or based on user preference. Then, the length of the spacer, which may be present at one or both ends of friction spring 4, can be adjusted so that the total height of the spring 4 and spacer(s) combined is the same for each embodiment, regardless of the number of coils in friction spring 4. The effect of the modification of the number of rings in friction spring 4 is illustrated in FIG. 10, which also illustrates the beneficial recoil reduction response of the inventive system as compared with a factory standard buffer system for a 300 Winchester Magnum rifle.

Figure 10:
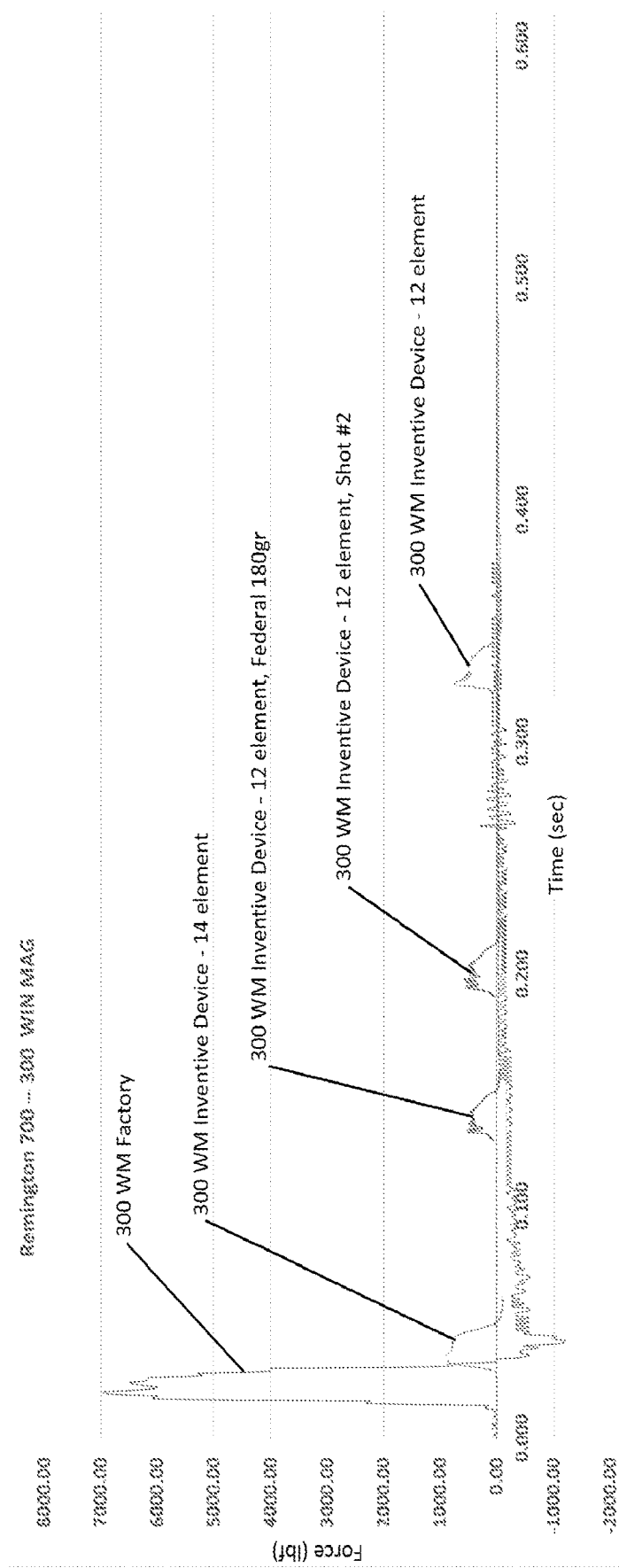
FIG. 10 is a graph illustrating the recoil force (lbf) per second produced by a shot of a weapon equipped with various embodiments of the present invention, plus a factory recoil buffer for comparison.
Figure 11:
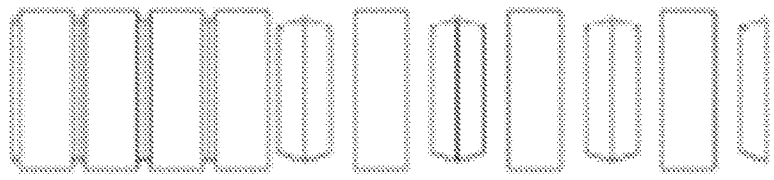
FIG. 11 shows a ring prescription according to embodiments of the present invention.

FIG. 10 is a graph illustrating the recoil force (lbf) per second produced by a shot of a weapon equipped with various embodiments of the present invention, plus a factory recoil buffer for comparison. The factory recoil buffer of a Remington 700-300 WIN MAG is indicated as "300 WM Factory". Each of the additional lines indicates the recoil force felt from a shot using a Remington 700-300 WIN MAG using one embodiment of the present invention. The indication of the number of "elements" in FIG. 10 corresponds to the total number of rings in spring stack 4, with reference to FIG. 11 (described in greater detail below). As can be seen, each of the shots produced by the weapon outfitted with the inventive device produces substantially lower recoil (lbf), and the subtraction of rings in the ring stack 4 can customize the delayed onset of recoil force felt by the user.

In embodiments, the invention includes ring prescriptions for various calibers of weapon. FIG. 11(A) shows the ring configuration for a Remington 700, wherein each row in the table illustrates a separate prescription for a ring stack in a given count. For each prescription, the total number of rings is indicated, along with the number of inner, outer, and end rings, and the total stacked height of the friction spring 4 for the given prescription. FIG. 11(B) illustrates one preferred ring prescription for various different calibers of weapons.

Figure 12:
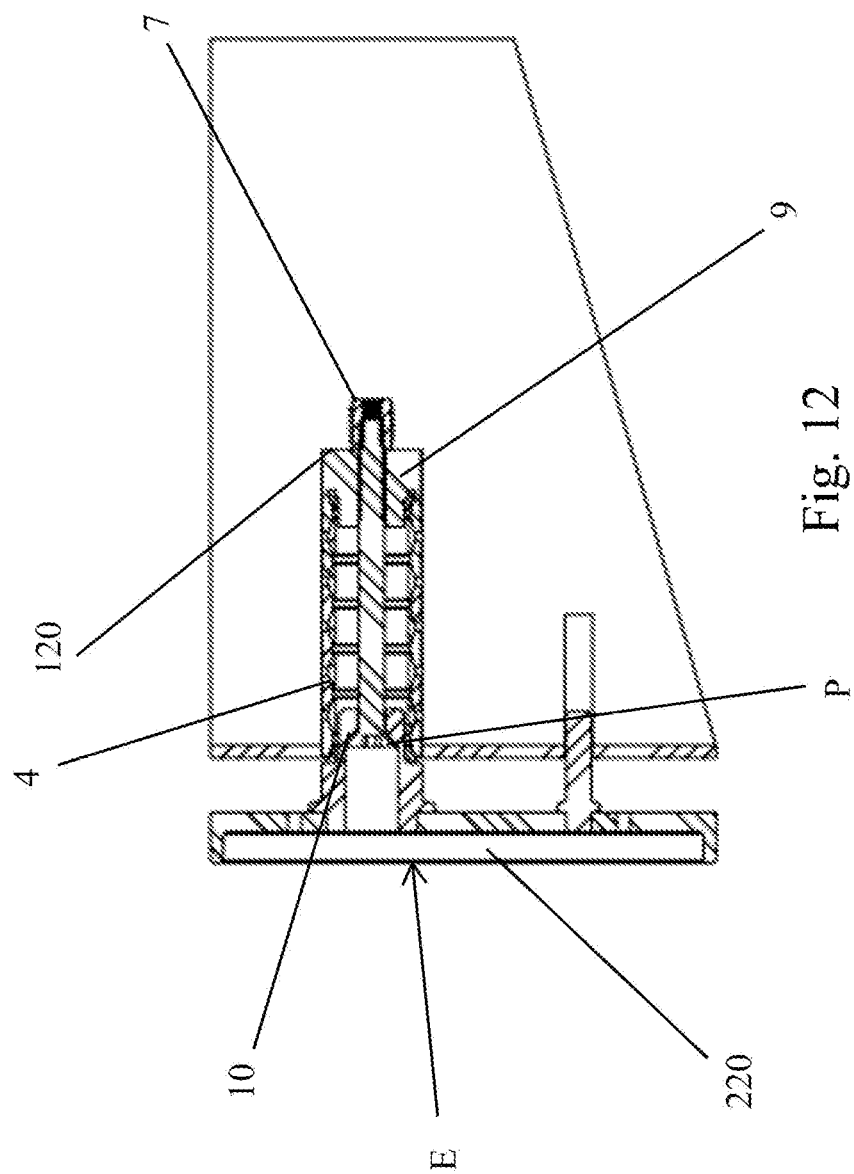
FIG. 12 shows the inventive recoil reduction system adapted for use in wooden rifle stocks according to embodiments of the present invention.

Yet another alternative embodiment is shown in FIG. 12, which shows the inventive recoil reduction system adapted for use in wooden rifle stocks. As shown therein, a modified forward body 120 may be sized and shaped to fit within a cylindrical bore drilled into the existing wooden rifle stock at a predetermined location. In embodiments, the bore will include an anterior portion which has a smaller cross-sectional diameter than the primary bore, in which to seat a threaded insert 7 for secure attachment of bolt 6 (not shown). The main portion of the bore can be sized to accommodate friction spring 4, along with spring seats 9, 10 which are affixed to or unitary with modified forward body 120 and modified rear body 220, respectively. Modified rear portion 220 can have a pocket P within which to seat the head of bolt 6 (not shown) and other dimensions similar to those described with respect to the remaining embodiments of the instant invention, except that an exterior portion E of modified rear body 220 can be sized to serve as, or accommodate, a shoulder pad or the like, or to be commensurate with the butt end of the weapon into which the inventive system will be inserted. Also shown in this embodiment is an anti-rotation pin 11 that performs the function described elsewhere herein with respect to this same component in separate embodiments.

Various types of weapons allow the user to adjust the distance from the trigger of the weapon to the butt end of the weapon, commonly known as "length of pull". It will be understood that the present invention may be adapted for use in such weapons, whereby the location of the inventive recoil reduction system will adjust based on the location of the butt plate as that weapon is adjusted through known means specific to that weapon to shorten or lengthen the "length of pull". Length of pull can be adjusted by adding spacers between the butt plate and butt pad or other means known in the art. Alternatively, length of pull can be adjusted by making the mounting position of the improved recoil reduction system of the present invention adjustable within the stock.

Figure 13:
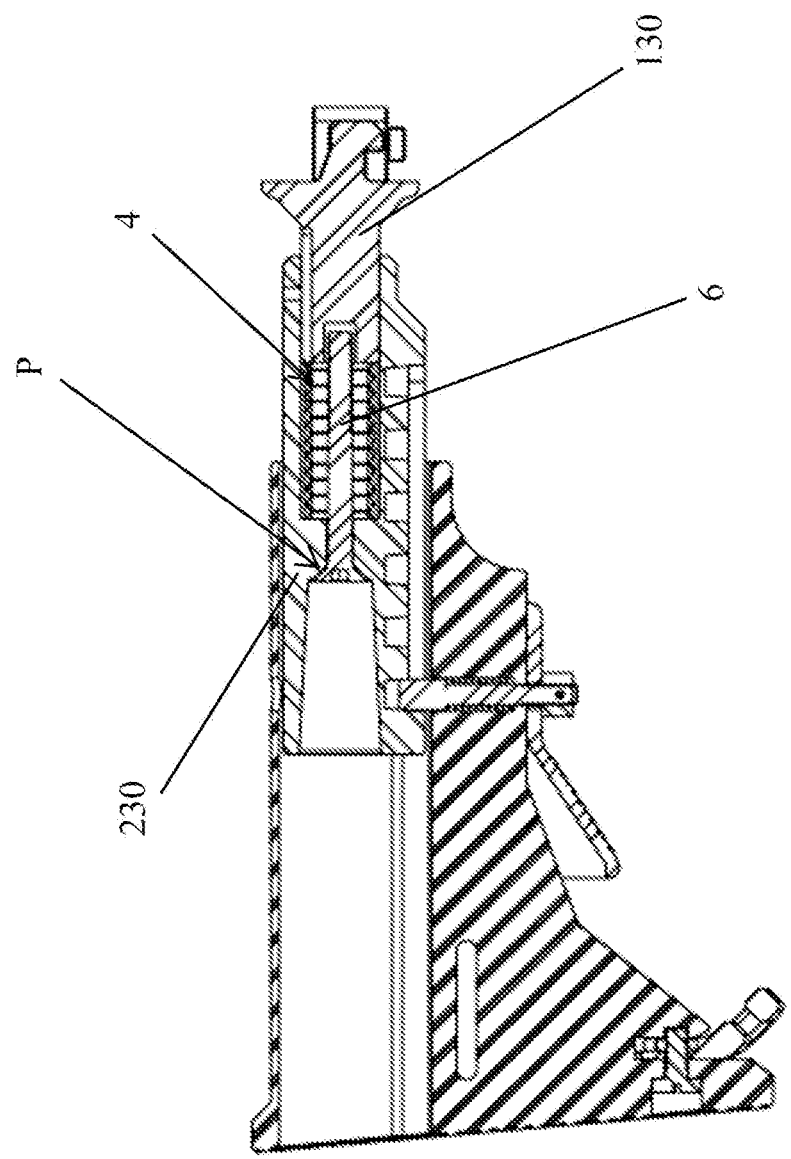
FIG. 13 shows the inventive recoil reduction system adapted for use in collapsible/tactical stocks according to embodiments of the present invention.

Yet another alternative embodiment is shown in FIG. 13, which shows the inventive recoil reduction system adapted for use in collapsible/tactical stocks. As shown in FIG. 13, a modified rear body 230 may envelope or surround (i.e., have an interior opening which houses) a larger portion of the remaining components, including friction spring 4 and modified forward body 130. All that is required of modified rear body 230 is that it include a secure attachment means and/or pocket P for the head of bolt 6 and a seat for friction spring 4. Likewise, modified forward body 130 should have a secure attachment for the threaded end of bolt 6 and a seat for the opposing end of friction spring 4.

Figure 14:
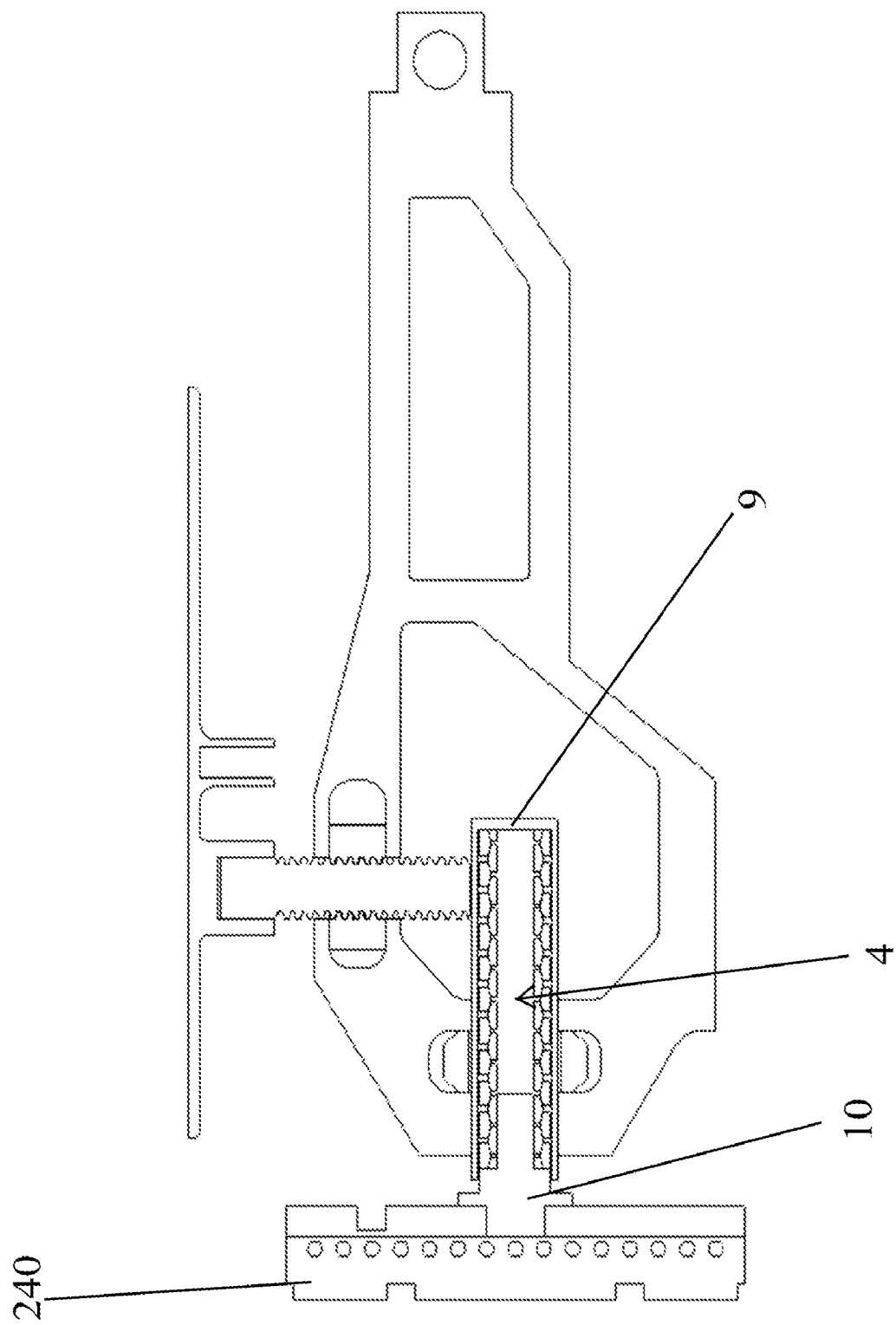
FIG. 14 shows the inventive recoil reduction system adapted to fit within a custom replacement stock according to embodiments of the present invention.

Yet another embodiment is shown in FIG. 14, which shows the inventive recoil reduction system adapted to fit within a custom replacement stock, in cases where the existing stock of the gun to which the invention will be applied does not have a compatible buffer tube or other means of retrofitting the stock to accommodate the inventive device. In embodiments, a replacement stock of the type envisioned for use in connection with the present invention is also known as a chassis. As shown in FIG. 14, the inventive recoil reduction system may be incorporated into the stock such that the modified rear body 240 includes, incorporates, or otherwise terminates at the end cap where the user's shoulder would rest during firing. Although one specific configuration of chassis is shown in FIG. 14, it will be understood that the present invention may be modified for use in any known configuration of chassis rifle. The critical components of the invention, regardless of the modifications required to adapt the invention to a particular weapon, include the friction spring 4, forward body and/or spring seat 9, a rear body and/or spring seat 10, and bolt 6 (not shown in the cross-sectional view of FIG. 14) which runs through the interior of friction spring 4.

Figure 15:
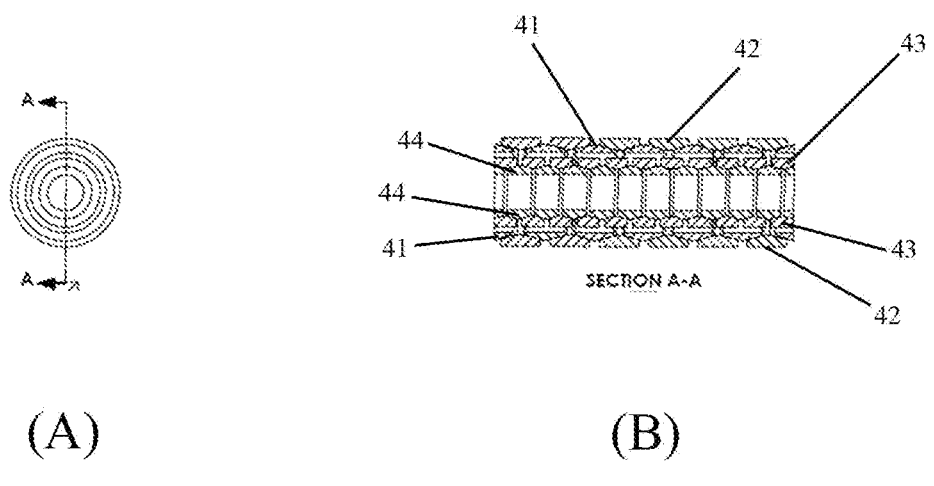
FIG. 15 is a composite ((A) and (B)) showing an end view (FIG. 15 (A)) of a doubly-nested friction spring 40 according to some embodiments of the present invention.

In embodiments, the friction spring 4 used in any of the above-described types of weapons could include two or more nested friction springs comprising a primary friction spring, and at least one additional friction spring having an exterior diameter sized to fit within an interior diameter of said primary friction spring. FIG. 15 is a composite ((A) and (B)) showing an end view (FIG. 15 (A)) of a doubly-nested friction spring 40 according to some embodiments of the present invention. FIG. 15(B) is a section view along section A-A as indicated in FIG. 15(A). As can be seen, a nested friction spring 40 according to some embodiments may comprise, from outermost to innermost layers, an outer ring 42 and an inner ring 41, each comprising a series of ring-shaped springs with mating tapered surfaces. In embodiments, as shown in FIG. 15(B), the non-tapered edge of the springs of inner ring 41 can be flat, and this back surface of inner ring 41 can surround an outer edge of a second set of outer 43 and inner 44 springs, each also comprising a series of ring-shaped springs with mating tapered surfaces. Additional sets of nested rings can be used as desired based on the recoil feel. A bolt (not shown) can be sized to fit within the opening of the innermost set of rings.

Also described herein is a method for custom manufacture of an improved recoil reduction device, as disclosed herein. According to that method, one or more characteristics of the custom fit are optimized, including: (1) the customization of the spring strength based on the energy class of the weapon; and (2) the placement of the inventive recoil reduction system within the stock of the gun to be retrofit. In embodiments of the inventive method, the number of coils or rings in the friction spring 4 of the one or more embodiments of the inventive device may be optimized to match one or more of the following factors: (A) energy class of the weapon in question, and/or (B) user preference. As described above, one or more spacers 9, 10 on either end of the friction spring 4 can be adjusted in length to provide a spring "stack" comprising friction spring 4 and spacers 9, 10 which has a predetermined length regardless of the number of rings making up, and the resultant length of, the friction spring 4. Also in embodiments of the inventive method, the location of the inventive recoil reduction system can be optimized within the existing stock, or within a custom replacement stock, of the weapon in question. In preferred embodiments, the inventive recoil reduction system is placed as high up within the stock of the gun as possible without compromising the integrity of the stock itself. Methods of the present invention may include preparing and utilizing a "sizing guide" which has optimal (or several preferred) values for each of the above-described characteristics, including number of coils in friction spring 4, distance between various exterior edges of the stock of various makes and models of weapons at which a bore should be drilled or the inventive device should otherwise be applied, or the like.

It will be understood by a person having ordinary skill in the art that the invention disclosed herein may be adapted to accommodate other types of weapons, such as those using skeleton stocks, but adjusting the shape and size of forward 100 and rear 200 bodies, and/or buffer 500, if used. In each case, the inventive device will comprise the following critical components, which have the functionality described with respect to each embodiment herein: (1) a forward body and/or spring seat; (2) a rear body and/or spring seat; (3) a bolt fixedly attached to said forward body and movably attached to said rear body; and (4) a friction spring compressed between said forward body and said rear body by attachment of said forward body and said rear body to opposite ends of said bolt, where the bolt runs through an interior of said friction spring.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expresses herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teaching of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

STATEMENT OF INDUSTRIAL APPLICABILITY

Rifles and shotguns have many applications in the defense and sporting industries. Downfalls of using high powered weapons such as these include fatigue on the user's body (shoulder) from repeated impact of the gun stock, which is forced back towards the user as the bullet is fired. The inventive device ameliorates this problem by substantially reducing the felt recoil of the weapon. In addition, firing accuracy and safety may be beneficially aided by the effect of the inventive device of reducing barrel lift.

I claim:

1. A recoil reduction device, comprising:
a forward body;
a rear body;
a bolt fixedly attached to said forward body and movably attached to said rear body; and
a friction spring compressed between said forward body and said rear body by attachment of said forward body and said rear body to opposite ends of said bolt, wherein said bolt passes between said forward body and said rear body through an interior of said friction spring;
wherein said forward body further comprises an interior cavity sized to house a cylindrical weight, and further comprising a cylindrical weight housed within said interior cavity; and
wherein a number of coils in said friction spring is calibrated to optimize a desired recoil force of a weapon in which said recoil reduction device is installed.

2. The recoil reduction device of claim 1, wherein said forward body comprises a threaded insert for capturing a distal end of said bolt.

3. The recoil reduction device of claim 2, wherein said rear body comprises a pocket to house a proximal end of said bolt in a movable and self-centering configuration.

4. The recoil reduction device of claim 1, further comprising a threaded insert for capturing a distal end of said bolt; and
wherein said interior cavity opens proximate a second end of said forward body, wherein said threaded insert is sized to fit within said cavity adjacent to said second end of said forward body.

5. The recoil reduction device of claim 4, wherein said second end of said forward body has a reduced exterior cross section sized to fit within a front end of said friction spring.

6. The recoil reduction device of claim 5, wherein a first end of said rear body has a reduced exterior cross section sized to fit within a rear end of said friction spring, said rear end being opposite said front end.

7. The recoil reduction device of claim 1, wherein
said friction spring comprises at least two inner rings and at least two outer rings, said inner rings each having two tapered top surfaces, and said outer rings each having two bottom tapered surfaces, and wherein
said tapered surfaces of said inner rings are each sized for mating engagement with an adjoining tapered surface of one of said outer rings.

8. The recoil reduction device of claim 1, wherein said friction spring comprises two nested friction springs.

9. A method for custom fitting a recoil reduction device within a weapon, the method comprising:
obtaining a recoil reduction device as described by claim 1;
customizing the number of coils in said friction spring based on both an energy class of said weapon and a desired recoil force; and
customizing a length of one or more spacers adjacent to said friction spring based on said number of coils in said friction spring.

10. The method for custom fitting a recoil reduction device within a weapon of claim 9, further comprising:
optimizing a location of said recoil reduction device within a stock of said weapon.

11. A recoil reduction device, comprising:
a forward body;
a rear body;
a bolt fixedly attached to said forward body and movably attached to said rear body;
a friction spring compressed between said forward body and said rear body by attachment of said forward body and said rear body to opposite ends of said bolt, wherein said bolt passes between said forward body and said rear body through an interior of said friction spring; and
a buffer at least partially enclosed within a second end of said rear body, wherein said buffer and said rear body both include a retaining pin aperture sized for receiving a retaining pin, the retaining pin aperture of said buffer being located to align with the retaining pin aperture of said rear body when said device is assembled;

wherein a number of coils in said friction spring is calibrated to optimize a desired recoil force of a weapon in which said recoil reduction device is installed.

* * * * *